United States Patent [19]

Helm

[11] 4,170,323

[45] * Oct. 9, 1979

[54] AUTOMOBILE TOP LUGGAGE RACK

[76] Inventor: Frederick A. Helm, 9818 Grinnell Ave., Detroit, Mich. 48213

[*] Notice: The portion of the term of this patent subsequent to Dec. 10, 1991, has been disclaimed.

[21] Appl. No.: 513,600

[22] Filed: Oct. 10, 1974

Related U.S. Application Data

[62] Division of Ser. No. 341,128, Mar. 14, 1973, Pat. No. 3,853,254.

[51] Int. Cl.² ............................................... B60R 9/04
[52] U.S. Cl. ........................................ 224/309; 296/91
[58] Field of Search ..................... 224/42.1 D, 42.1 E, 224/42.1 R, 29 R, 42.45 R; 293/1, 54 D; 296/85, 91, 1 S, 84 H, 86, 87, 88

[56] References Cited

U.S. PATENT DOCUMENTS

| | | | |
|---|---|---|---|
| 2,499,136 | 2/1950 | Edlund et al. | 296/85 |
| 3,223,301 | 12/1965 | Helm | 224/42.1 D |
| 3,368,841 | 2/1968 | Grau | 296/91 |
| 3,436,297 | 4/1969 | Brooks et al. | 293/54 D |
| 3,554,416 | 1/1971 | Bott | 224/42.1 E |
| 3,853,254 | 12/1974 | Helm | 224/42.1 D |
| 3,856,193 | 12/1974 | Bott | 224/42.1 D |

Primary Examiner—Robert J. Spar
Assistant Examiner—Jerold M. Forsberg
Attorney, Agent, or Firm—Barnes, Kisselle, Raisch & Choate

[57] ABSTRACT

A car top carrier comprises spaced pairs of stanchions and a side rail between the stanchions. Each stanchion has a laterally extending opening therein and an insert projecting into said opening. A screw locks the insert in angularly adjustable position with respect to the stanchion. A cross rail and the inserts have telescoping portions forming a connection therebetween. The cross rail has the major portion thereof of non-circular cross section so that the angular position of said cross section with respect to said stanchions can be adjusted by adjusting the angular position of each insert with respect to each pair of stanchions.

4 Claims, 9 Drawing Figures

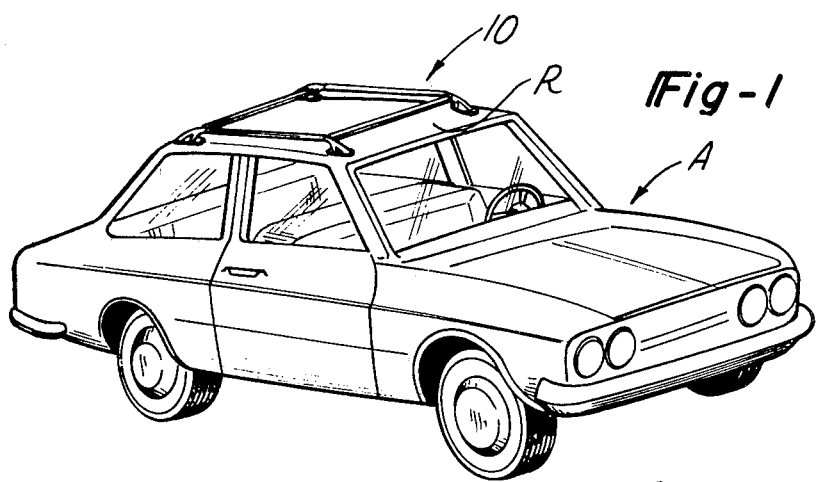
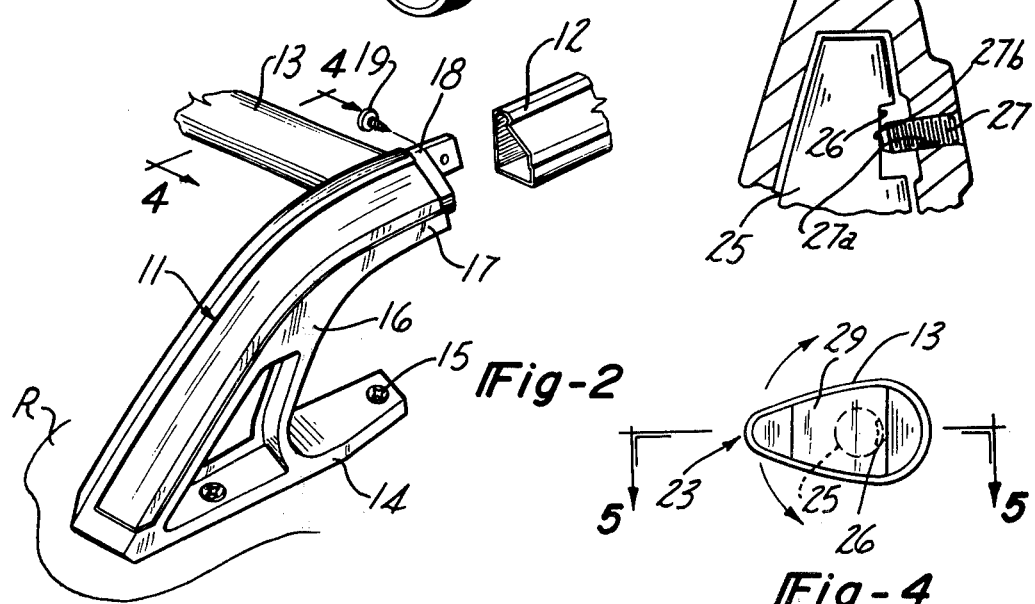
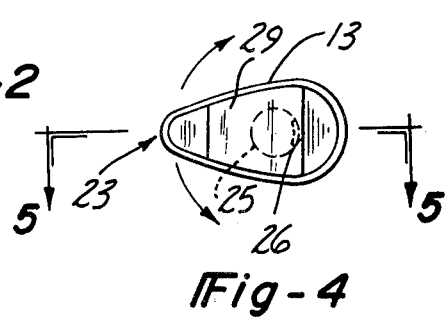
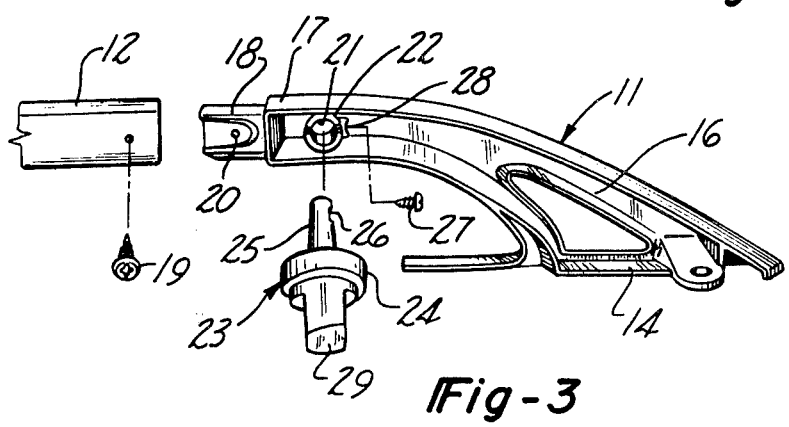

AUTOMOBILE TOP LUGGAGE RACK

This is a division of application Ser. No. 341,128, filed Mar. 14, 1973 now U.S. Pat. No. 3,853,254.

This invention relates to automobile top luggage racks and particularly to such racks for large or small automotive vehicles.

BACKGROUND OF THE INVENTION

It is common to provide luggage racks for vehicles which consist of four stanchions between which side and cross rails extend. Among the problems with respect to such racks is that the configuration of the cross rails often results in noise when combined with the curvature of various automobile tops. Another problem is that the roofs of various cars curve differently in transverse cross sections so that the stanchions must have a different angular orientation to the cross rails. Another problem with respect to automotive vehicles is the accumulation of dirt, snow and the like, on the rear window of the vehicles, particularly vehicles of the station wagon type.

Accordingly, among the objects of the invention are to provide a novel automobile top rack which includes novel means for cancelling out wind noise on various roof curvatures; for angularly adjusting the cross rails with respect to the stanchion; wherein a neat and pleasing appearance is achieved; a novel deflector construction is provided which does not require any cantilever mounting or similar auxiliary structure for supporting the deflector.

SUMMARY OF THE INVENTION

In accordance with the invention, the car top carrier comprises spaced pairs of stanchions, a side rail and means for fixing the side rail to the stanchions. Each said stanchion has a laterally extending opening therein into which a portion of an insert projects. Means are provided for locking the insert in angularly adjustable position with respect to the stanchion. A cross rail and the inserts have telescoping portions forming a connection therebetween. The cross rail has the major portion thereof of non-circular cross section so that the angular position of said cross section with respect to said stanchions can be adjusted by adjusting the angular position of each insert with respect to the stanchions. In another form, a deflector extends between the stanchions at the rear of the vehicle.

DESCRIPTION OF THE DRAWINGS

FIG. 1 is a perspective view of an automobile embodying the invention.

FIG. 2 is a fragmentary exploded perspective view of a portion of the rack shown in FIG. 1.

FIG. 3 is a side exploded view of a portion, parts being broken away.

FIG. 4 is a sectional view taken along the line 4—4 in FIG. 2.

FIG. 5 is a sectional view taken along the line 5—5 in FIG. 4.

DESCRIPTION

Figure 6:
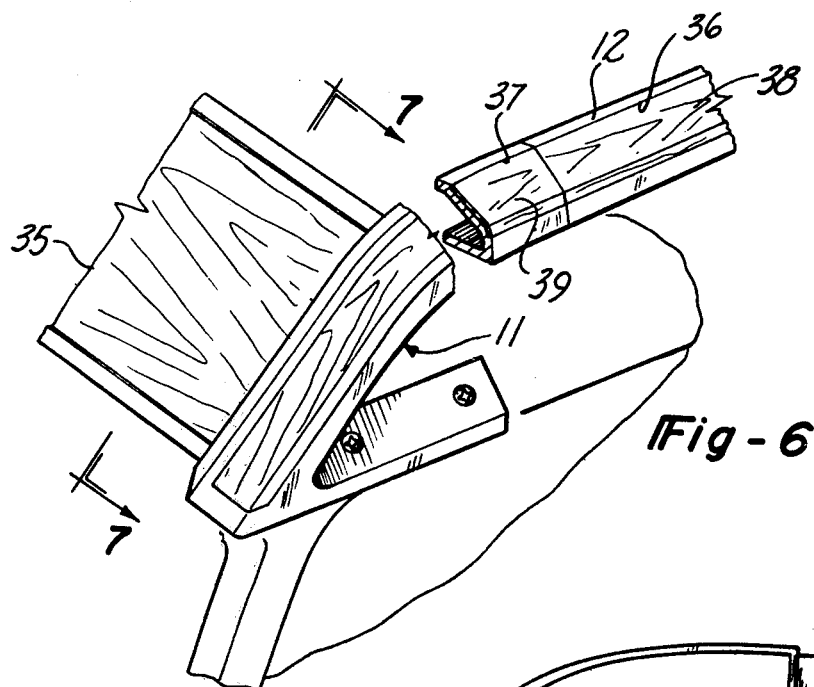
FIG. 6 is a fragmentary perspective view of a modified form of the invention.

Referring to FIG. 1, the automobile A is adapted to have a car top rack 10 on the roof R thereof which comprises four identical stanchions 11, one pair at each end of the car top 10, with longitudinally extending side rails 12 extending between the stanchions and cross rails 13 extending between the stanchions. As shown, the stanchions comprise a base 14 adapted to be fixed to the roof of the vehicle by screws 15 and an upright 16 having an inwardly extending horizontal portion 17 with a projection 18 over which the tubular side rail 12 is telescoped and held in position by a sheet metal screw 19 threaded into an opening 20 into the projection 18.

The stanchion is preferably die cast and includes a laterally extending opening 21 formed by a cylindrical projection 22. An insert 23 having an enlarged portion 24 and a projection 25 is provided so that the projection 25 is inserted in the opening 21. As shown in FIG. 5, the projection 25 includes a circumferential groove 26, the base of which is curved or convex in a circumferential direction. A set screw 27 having a slip resistant nylon insert 27a is threaded through an opening 28 into the groove 26 to lock the angular adjusted position of the insert 23. The end of the screw has a cup point 27b. The projection 25 is preferably frusto-conical in cross section and the opening 21 has a complementary configuration. In addition, the groove 26 is recessed to minimize the interference of burrs from drilling and tapping opening 28. Instead of having a groove base, the groove may have two or more flat angularly related surfaces which are engaged by the set screw 27 to establish corresponding angular positions of the cross rail. The insert 23 further includes a projection 29 over which the tubular cross rail 13 is telescoped. The cross rail 13 is preferably of non-circular cross section, for example, teardrop cross section as shown in FIG. 5.

By adjusting the positions of the inserts 23 with respect to the uprights, the relative position of the cross section of the cross rail 13 can be adjusted in the direction of the arrow shown in FIG. 5 to minimize noise.

Figure 7:
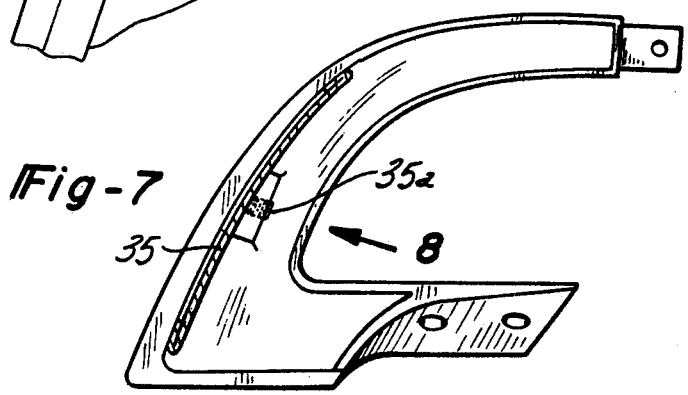
FIG. 7 is a fragmentary sectional view taken along the line 7—7 in FIG. 6.
Figure 8:
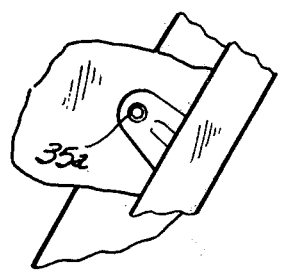
FIG. 8 is a fragmentary view on an enlarged scale taken along the line 8 in FIG. 7.

In the form of the invention shown in FIGS. 6 and 7, a deflector 35 in the form of a sheet of metal or the like extends between and is fastened at its ends by screws 35a to the inclined portion of the uprights 11 so that the stanchions form the sole support for the deflector and hold it in proper safe relation to the car top roof to provide the necessary deflection or air over the rear window of the vehicle to keep the rear window clear and free of dirt.

As shown in FIGS. 2 and 6, the side rails 12 and stanchions 11 have aligned recesses 36, 37 for receiving decorative strips 38, 39, such as pressure sensitive wood grained vinyl to provide a continuous aesthetic design pattern extending from the end of the carrier to the other. This construction provides a rigid mount for the deflector avoiding any need for cantilever mount and avoiding any need for intermediate brackets between the ends of the deflector.

Figure 9:
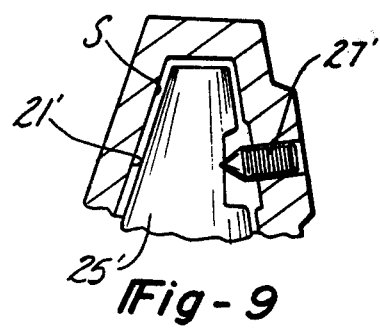
FIG. 9 is a view similar to FIG. 5 of a modified form of the invention.

The strips 38, 39 are made of relatively thick rigid vinyl material having a thickness on the order of 0. The strips 38, 39 are made in the following manner. A sheet of vinyl is first formed with the decorative exterior surface. This sheet is then slit into strips of the proper width. Pressure sensitive adhesive is applied to the strips and a protective layer of flexible material such as acrylonitrile butadiene styrene is applied over the pressure sensitive adhesive on each strip. The strip is then molded under pressure and temperature to provide the desired cross sectional configuration. The protective layer is then removed exposing the pressure sensitive adhesive so that the decorative strip can be applied to the stanchion or side bar as the case may be.

Where the curvature of the cross section of the roof varies, provision can be made for angularly adjusting the relationship of the stanchion with respect to the axis of the cross bar. As shown in FIG. 9, this construction comprises utilization of a pointed set screw 27′ in place of the cup pointed set screw 27. In addition, the dimensions of the projection 25 and opening 21′ are such that that there is a space S permitting some angular movement of the projection 25 with respect to the axis of the opening 21′. When the set screw 27′ is threaded inwardly, it will lock the projection 25′ with respect to the opening 21′ in the adjusted position.

I claim:

1. In a car top carrier, the combination comprising
   a pair of stanchions,
   a side rail,
   means for fixing the side rail to one of the stanchions,
   each said stanchion having a laterally extending opening therein,
   an insert having a portion projecting into said opening,
   means for locking the insert in angularly adjustable position with respect to the stanchion,
   and a cross rail,
   said cross rail and said inserts having telescoping portions forming a connection therebetween,
   said cross rail having the major portion thereof of non-circular cross section,
   whereby the angular position of said cross section with respect to said stanchions can be adjusted to various positions by adjusting the angular position of each insert with respect to the stanchion,
   a deflector,
   said stanchions having uprights,
   means for fixing said deflector to said upright portions such that the deflector extends between the upright portions to effectively deflect air to clear the rear window of the car,
   said stanchions thereby forming the sole support for supporting said deflector from the ends of the deflector.

2. The combination set forth in claim 1 wherein said stanchion and said side rail having aligned recesses, and a layer of decorative material in each said recess.

3. In a car top carrier, the combination comprising
   two pairs of stanchions,
   a side rail,
   means for fixing the side rail to the stanchions,
   each stanchion of one pair of stanchions having a laterally extending opening therein,
   an insert having a portion projecting into said opening,
   means for locking the insert in angularly adjustable position with respect to the stanchion,
   and a cross rail,
   said cross rail and said inserts having telescoping portions forming a connection therebetween,
   said cross rail having the major portion thereof of non-circular cross section,
   whereby the angular position of said cross section with respect to said stanchions can be adjusted by adjusting the angular position of each insert with respect to the stanchion,
   a deflector,
   said other part of stanchions having uprights,
   means for fixing said deflector to said upright portions such that the deflector extends between the upright portions,
   said stanchions thereby forming the sole support for supporting said deflector from the ends of the deflector.

4. The combination set forth in claim 3 wherein said stanchion and said side rail having aligned recesses, and a layer of decorative material in each said recess.

* * * * *